Patented June 19, 1951

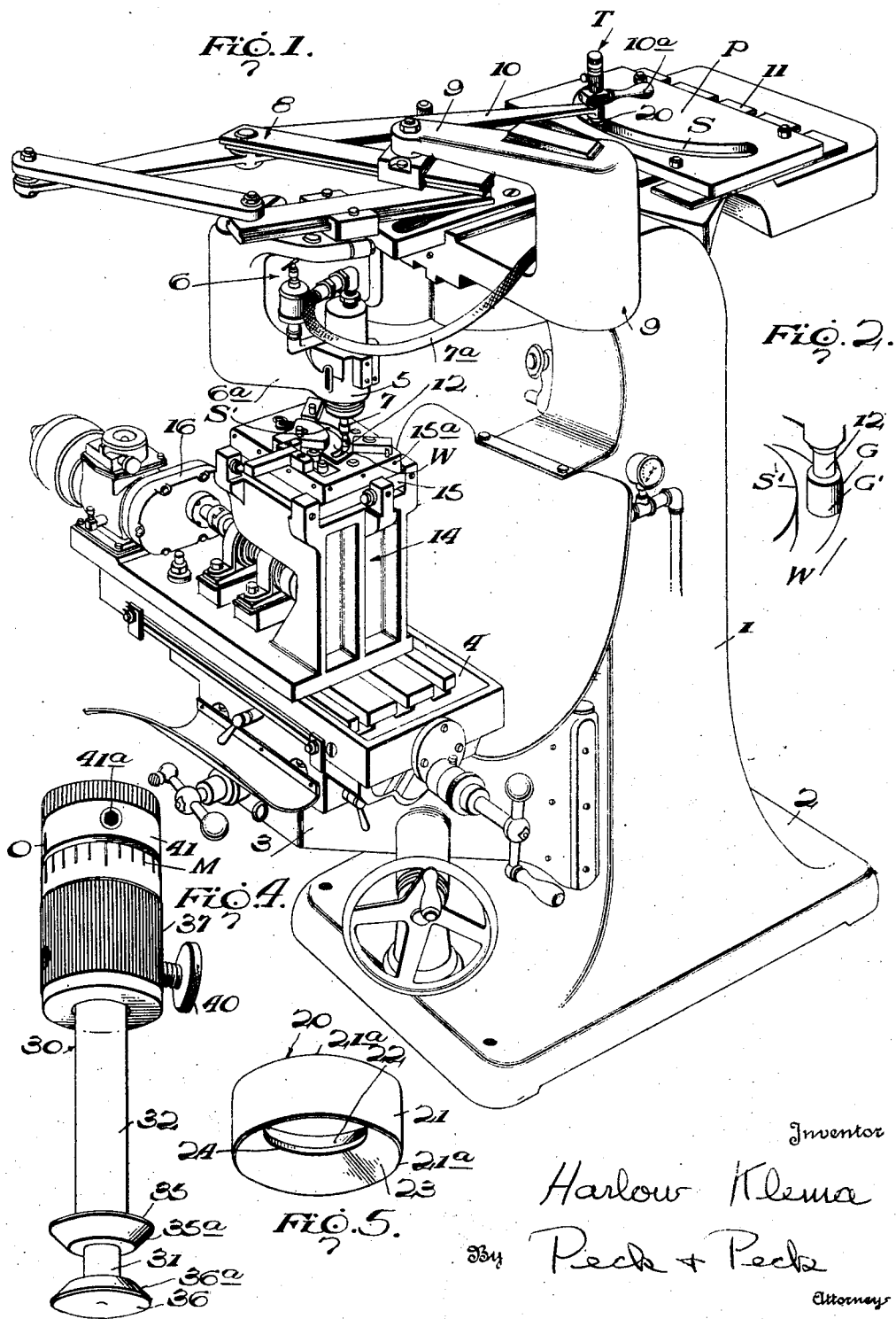

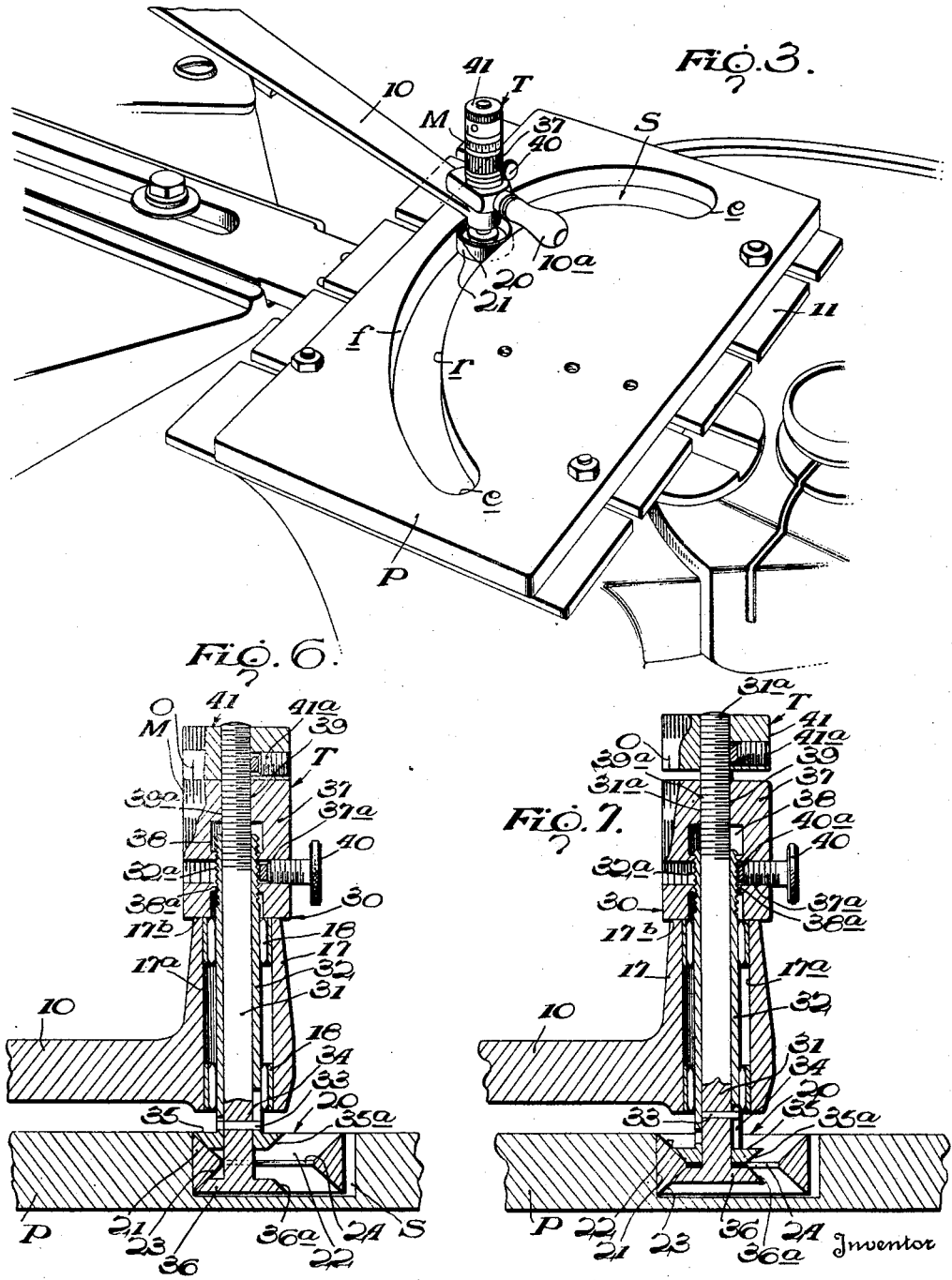

2,557,876

UNITED STATES PATENT OFFICE 2,557,876

ADJUSTABLE COMPENSATING TRACER STYLE UNIT

Harlow Klema, Racine, Wis., assignor to George Gorton Machine Co., Racine, Wis., a corporation of Wisconsin Application September 25, 1945, Serial No. 618,569

8 Claims. (Cl. 33—23)

This invention relates to adjustable compensating tracer style units; and the nature and objects of the invention will be readily recognized and understood by those skilled in the arts involved in the light of the following detailed description and explanation of the accompanying drawings illustrating what I now consider to be a preferred embodiment or mechanical expression of my invention from among various other embodiments, designs, forms, arrangements, and expressions, and constructions and combinations of parts and elements, of which my invention is capable within the broad spirit and scope thereof.

My present invention is primarily and particularly directed to meeting and overcoming or compensating for the effects or results of certain inherent operating conditions encountered and met with in so-called profile grinding and the like operations, which conditions prevent the attainment of maximum accuracy and precision in grinding and shaping a profile forming surface in a workpiece that will be an exact and accurate duplicate or scaled reproduction of the master profile forming surface of a pattern or template. Such profile grinding operations are usually carried out and performed by an arrangement of apparatus in which a rotary grinding tool having a generally circular or cylindrical grinding element or head to provide an annular peripheral grinding surface, is controlled and moved through the medium of a pantograph or other motion duplicating or reproducing mechanism, to duplicate or reproduce the motions of a tracer carried by the pantograph mechanism, as the tracer is moved to follow or scan and be guided over and by that surface of the pattern or template which it is desired to have the grinding tool duplicate or reproduce on or in the workpiece.

It has been found from experience in carrying out and performing such general character of profile grinding operations that frequently, due to wear of the peripheral grinding surface of the generally circular grinding element or head of the grinding tool, the finished and final profile forming surface that has been ground by the tool in the workpiece is not an accurate and precise duplicate or reproduction of the master profile forming surface of the pattern or template. With such an arrangement of grinding tool associated with and moved by a pantograph or other motion reproducing mechanism, the tracer by which the operations of the pantograph or motion reproducing mechanism are controlled from a pattern or template, is associated with or carried by the pantograph or reproducing mechanism, mounted in position laterally spaced from the grinding tool but with its longitudinal axis parallel with the axis of rotation of the grinding tool. The tracer style so mounted, provides or is provided with, a pattern or template scanning or engaging style forming portion or head which is of generally circular cross section providing a circular or annular pattern or template engaging surface which lies in a plane generally parallel with the plane of the peripheral grinding surface of the circular grinding element or head of the grinding tool.

With apparatus of the aforesaid general character and arrangement, at the start of an operation to grind a profile forming surface in a workpiece which will be an exact and precise duplicate or scaled reproduction of a profile forming surface of a pattern or template, the pattern or template and the workpiece are mounted in a fixed, laterally spaced relationship a predetermined distance apart in positions for operative engagement by the tracer style and by the grinding tool, respectively, as the tracer style is moved to follow or scan the pattern or template. The diameter of the circular pattern or template engaging or scanning style forming portion of the tracer and the diameter of the grinding element or head of the grinding tool, are each predetermined and bear a definite relationship to each other, in that, with the peripheral contact surface of the tracer style in its full maximum engagement with the profile forming surface of the pattern or template at any location along such surface, the work engaging portion of the peripheral grinding surface of the grinding element or head will be spaced a definite and predetermined distance from the engaged portion of the profile forming surface of the pattern or template. In such position of the style, the plane passing through the work engaging portion of the grinding surface of the grinding element or head which is at the maximum radial distance from the axis of rotation of the element or head at the work engaging side of the grinding tool, defines and is in effect, the plane of the surface resulting from the maximum cut or grind possible for the grinding tool, that is to say, the plane of the finished or completed profile forming surface that can be cut or ground into the workpiece by the grinding tool with any given predetermined spacing between the axis of the style and the axis of the grinding tool, with a given diameter of grinding tool element or head.

With the grinding tool in grinding engagement with the workpiece, when the tracer style is in full and maximum engagement with the pattern or template profile forming surface being reproduced, at any location on the surface, then the grinding tool will have cut or ground away the maximum of stock from the workpiece and will have attained its position of maximum grind and will have completed the formation of the duplicated or reproduced profile surface in the workpiece as defined by and in accordance with the style engaged surface of the pattern or template. However, the foregoing assumes that the diameter of the grinding element or head of the grinding tool remains fixed and constant during and throughout the operation of grinding away the stock of the workpiece to attain the position of maximum grind or cut, and the substantial maintenance of the predetermined diameter of the grinding element or head throughout the grinding operation is a required condition or factor for the attainment of maximum accuracy and precision of duplication or reproduction in the workpiece of the profile forming surface of the pattern or template.

In actual profile grinding operations, the grinding tool is moved laterally or radially in grinding engagement with the workpiece to grind or cut away the stock or material of the workpiece until the maximum grinding position of the grinding tool is attained in order to form the duplicated or reproduced profile surface in or on the workpiece, as determined by the maximum full engagement of the tracer style with the pattern or template. As a result of the grinding operations, it is found that wear of the peripheral grinding surface of the grinding tool frequently occurs, and that the extent or degree of such grinding surface wear may be such as to have sufficiently reduced the effective diameter of the grinding element or head of the grinding tool, so that, the grinding tool of such reduced diameter will reach a position of maximum grind in advance of the predetermined and desired position necessary to form the accurately duplicated or reproduced profile surface in the workpiece. The extent or degree of any such diameter reducing grinding tool wear will, of course, vary in accordance with and be determined by the character or type of grinding tool employed, the character of the material of the workpiece being ground, the quantity of stock required to be ground away and removed, and the rate of speed with which the grinding is attempted to be performed, as well as by the operating technique of the operator.

Thus, the predetermined and definite spacing relationship between the pattern or template engaging surface of the tracer style and the work engaging peripheral grinding surface of the grinding tool element or head will be upset and destroyed by the decrease in diameter of the grinding element or head, with the result that the finished surface formed by the grinding tool in the workpiece will not be the accurate and precise duplicate or scaled reproduction of the pattern or template surface. For example, in the case of the duplication or reproduction of a profile surface surrounding and enclosing or partially surrounding and enclosing, and defining an opening, the profile surface formed in the workpiece will not be a duplicate or the intended scaled reproduction as to size, but will be of smaller dimensions as to width and length than those intended and desired, due to the decrease in diameter of the grinding element or head of the grinding tool.

Such profile grinding operations are essentially a finishing operation, in that, the major portion of the stock of the workpiece required to be removed has been previously machined or cut out to the approximate profile surface which it is desired to form in the workpiece, so that, usually there remains only a thickness of stock of the order, for example, of say three to four thousandths of an inch (.003" to .004") to be ground away by the profile grinding operations in order to accurately complete and precisely duplicate or reproduce the desired profile forming surface by the movement of the grinding tool by the motion duplicating or reproducing mechanism under the control of the template or pattern engaged by the tracer style. It has been determined that the efficiency of such profile grinding finishing operations can be increased and the results obtained thereby improved, while at the same time reducing possibility of wear of the grinding surface of the grinding tool, if these profile grinding operations are carried out to grind or cut away the remaining stock to be removed, by a series of grinds, each of which is controlled or limited as to the depth of the grind and of the stock removed, so that the maximum depth or thickness of stock which can be ground or cut away by each of such grinds is, for example, a maximum say of the order of one thousandth of an inch (.001") of stock.

One of the primary objects, therefore, of my present invention is to provide mechanically and structurally simple and efficient compensatory and adjusting means in, and as a part of, an arrangement or organization consisting of a motion duplicating or reproducing mechanism, a pattern controlled tracer style unit associated therewith for actuating such mechanism, and a grinding or the like tool for movement by the tracer style unit actuation of such mechanism, through the medium of which an operator can selectively make micrometer measured, minute and precise changes and adjustments in the distance or spacing between the template or pattern engaged surface of the tracer style and the workpiece engaged grinding surface of the grinding tool, in order to change and adjust such distance or spacing to accurately compensate for error producing changes in the predetermined and required distance between the template engaged surface of the tracer style and the workpiece engaged surface of the grinding tool, which may be occasioned and caused by wear of the peripheral grinding surface of the grinding tool and which result in reducing the effective diameter of such peripheral workpiece engaging grinding surface; and further by which the operator may selectively adjust and set the aforesaid distance or spacing to a predetermined distance or spacing so as to positively limit the maximum grind or stock removing cut of the grinding tool, so that the grinding tool will thus be limited to the removal of a predetermined maximum thickness or depth of stock for each cut or grind completed therewith.

It is a further and specific object of my invention to provide such an adjusting and compensating means as embodied in and forming a mechanical and structural part of a tracer style unit adapted for mounting in operative association and relation with a motion duplicating or reproducing mechanism and the grinding or other tool associated with and for movement by such mechanism, which tracer style unit is so constructed and arranged that when in mounted position in operative association on and with the motion duplicating or reproducing mechanism, the tracer style unit is manually accurately adjustable by an operator over a predetermined range of adjustments to effect a desired change or adjustment in the spacing or distance between the pattern or template engaging surface of the tracer style unit and the work engaging surface of the grinding or the like tool associated with and moved by the motion duplicating or reproducing mechanism, so that, the operator may compensate for changes in such spacing occasioned by operating conditions, or may arbitrarily selectively adjust such spacing to limit or adjust the maximum grind or cut possible for the grinding tool.

A further object of the invention is to provide such an adjustable compensating tracer style unit by which the compensating or adjusting changes in the distance or spacing between the pattern engaging surface of the style and the work engaging surface of a grinding or the like tool, are effected and carried out by selectively adjusting and changing the radial distance between the axis of the tracer body or stem of the tracer style unit and the portion of the surface of the style of the unit to be engaged with a template or pattern, to thereby correspondingly change and adjust the distance between the template or pattern engaging surface of the style and the work engaging surface of the tool.

Another object of the invention is to provide an adjustable and compensating tracer style unit for mounting and operative association with a motion duplicating or reproducing mechanism, embodying a tracer body and a tracer style for engaging a profile surface of a template or pattern, in which minimum operating friction is developed in moving the tracer style in engagement with and along the pattern or template surface to be duplicated or reproduced, to thus reduce and maintain at a minimum the operating forces required in manually moving the tracer while increasing the sensitivity and the accuracy of manual operation of such tracer unit and the associated motion duplicating or reproducing mechanism.

A further object of the invention is to attain such minimum operating friction and high operating sensitivity for a tracer style unit, by a design and construction in which the pattern or template engaging style is formed by an annulus or ring member having its outer periphery forming an annular surface for rolling engagement with and over the profile forming surface of a pattern, and in which the tracer body of the unit is rotatably mounted and is provided with an annular or circular surface at and around one end thereof of a diameter less than the internal diameter of the style forming ring member, for "floating" association with the style forming ring member in engagement with the adjacent portion of the inner annular surface of such ring member to force and maintain the outer annular surface of such member in engagement with the profile forming surface of a pattern, so that the tracer body is rotated by rolling engagement with and around the inner surface of the style forming ring member as the latter member revolves in a general planetary motion relative to and about the rotating tracer body as the style forming ring member is rolled along and maintained in contact with the profile forming surface of a pattern by radial or lateral motion of the body of the tracer style unit.

It is a further object of the invention to provide for precision adjustments in the radial distance between the axis of the style body and the portion of the annular pattern engaging surface of the style forming ring member of such a tracer style unit, when the tracer body is in position maintaining the style in engagement with the pattern, by a construction and arrangement in which the tracer body includes mechanism operable to change the relationship between the inner annular surface of the style forming ring member and the annular surface of the tracer body which is engaged thereby, so as to move the tracer body radially inwardly or outwardly relative to the outer periphery of the style forming ring member and thereby adjust and rest the tracer body relative to the style forming ring member so as to change the spacing or radial distance between the longitudinal axis of the tracer body and the portion of the peripheral annular surface of the style forming ring member engaged with the pattern surface.

The invention holds as a further object the provision in such a design and construction of adjustable and compensating tracer style unit, of a micrometer mechanism built into and as a part of the unit for manual actuation to effect operation of the mechanism of the traced body to increase or decrease the spacing or distance between the longitudinal axis of the tracer body and the pattern engaged portion of the outer peripheral surface of the tracer style, and for setting and releasably locking the tracer body in any such adjusted position and to provide such a micrometer mechanism with a readily visible scale calibrated for minute adjustments of the order of approximately one-thousandth of an inch (.001") or less, so that, with such adjustable tracer style unit in mounted operative association with a motion duplicating or reproducing mechanism and the grinding tool or the like moved thereby, the operator can accurately make micrometer measured and precise adjustments in the spacing between the tracer style and the grinding tool.

Another object of the invention is to so design and construct an adjustable and compensating tracer style unit having the several general characteristics and features heretofore indicated as objectives of the invention, as to provide a fully self-contained, compact unit of a generally elongated cylindrical body or barrel type capable of being readily and practically mounted in position on and in operative association with a motion duplicating or reproducing mechanism which is to be moved by said tracer style unit, and in which unit the micrometer mechanism for effecting the precision adjustments in the unit is formed by a manually rotatable cylindrical micrometer dial having a micrometer scale therearound and an adjacent axially alined cylindrical stop nut or head fixed against rotation and having an index or zero line or mark thereon for cooperation with the scale of the micrometer dial, with such micrometer dial and nut or head located at and forming and defining the outer end length of the cylindrical body of the tracer style unit at the end thereof opposite the pattern engaging style, so that the micrometer is in readily accessible position for manual adjustment and accurate visual reading of the micrometer scale by the operator.

With the foregoing general objects, features and characteristics, as well as certain other objects, features, and characteristics in view, which will be at once apparent to those skilled in the arts involved from the following explanation, the invention consists in certain novel features in design and construction and in combinations and arrangements and functioning of elements, as will be more fully pointed out and referred to hereinafter.

Referring to the accompanying drawings in which similar reference characters refer to corresponding parts and elements throughout the several figures thereof:

Fig. 1 is a perspective view of a pattern controlled duplicating or reproducing machine of the manually actuated pantograph type adapted and arranged for carrying out and performing profile grinding operations, with an adjustable end compensating tracer style unit of my invention mounted on and in operative association with the actuating arm of the pantograph mechanism of the machine, the tracer style being shown in operative association with a profile pattern or template, and the grinding tool to be moved by actuation of the pantograph being shown in grinding engagement with a workpiece for grinding out and duplicating or reproducing the profile surfaces of the pattern in the workpiece.

Fig. 2 is an enlarged perspective view of the work engaging element or head of the grinding tool of the machine of Fig. 1, showing such element in grinding engagement with the workpiece, a portion of the workpiece only being shown.

Fig. 3 is an enlarged perspective view of the pattern or template supported in position on the copyholder or pattern supporting table of the machine of Fig. 1, and showing the tracer style of the tracer style unit of the invention in operative position in engagement with the forward profile surface of an arcuate slot in the pattern.

Fig. 4 is a perspective view of the adjustable tracer style unit of the invention removed from the tracer arm of the pantograph of the machine of Fig. 1, the tracer style of said unit having been removed therefrom.

Fig. 5 is a perspective view of the tracer style annulus or ring member removed from the unit.

Fig. 6 is a vertical longitudinal sectional view through the tracer style unit in mounted position on the tracer arm of the pantograph of the machine of Fig. 1, and through the pattern or template, with the tracer style shown in operative contact with the profile forming surface of the pattern or template, the tracer unit being shown in its adjusted position with the tracer body or stem at its limit of radially outward adjustment relative to the style to provide the minimum radial distance between the axis of the tracer body and the pattern engaged surface of the style for which the unit is capable of being adjusted.

Fig. 7 is a vertical longitudinal sectional view similar to Fig. 6, but with the tracer style unit shown in its adjusted position with the tracer body or stem at its limit of radially inward adjustment relative to the style to provide the maximum radial distance between the axis of the tracer body and the pattern engaged surface of the style for which the unit is capable of being adjusted.

I have selected a machine tool, such as an engraving, die-sinking, routing, or milling machine, of the pantograph controlled type, adapted to and set up for carrying out and performing so-called profile grinding operations, to serve as an example for the purpose of illustrating and describing a particular adaptation of an adjustable compensating tracer style unit embodying the principles and features of my invention, in order to fully explain and exemplify such principles and features so that those skilled in the art will fully comprehend the same. However, it is to be understood that by so selecting such type of tracer controlled machine tool for performing profile grinding operations, it is not intended or desired to thereby limit my invention to either the specific structure for such particular adaptation of the invention, or to the particular type of machine, or to the profile grinding operations as performed and carried out by such machine under the control of the adjustable compensating tracer style unit of the invention as adapted thereto and associated therewith. It is recognized that adjustable compensating tracers embodying my invention are adapted to and of utility with various types of machines, whether or not controlled by a pantograph form of motion transmitting mechanism, employing or utilizing tracers for following a pattern or other copy in performing and carrying out various operations and techniques, such, for example, from among others, as machines of the types usually employed for two-dimensional grinding or milling in which a tracer is employed to follow a pattern or template in the operation of such machines.

The pantograph controlled machine of the selected example illustrated in Fig. 1 of the accompanying drawings, includes a main frame or column 1 extending upwardly from and supported on a base 2, with a vertically adjustable knee or other support 3 located at the forward side of the column 1 on which a work table 4 is suitably movably and adjustably mounted in the usual manner.

A vertically disposed cutter head 5 is mounted and carried by the outer or forward arm or link 6a of a horizontally swingable pivoted link supporting structure 6, which structure is supported extending forwardly from the upper end portion of the main frame or column 1 of the machine with the cutter head 5 positioned above the work table 4 for universal lateral movement over and above the work table. In this instance, the machine is adapted and arranged for profile grinding operations, and the cutter head 5 includes a high-speed, rotary grinding spindle 7 journalled therein in vertically disposed position. This spindle 7 is of the type adapted to be driven or rotated by pressure fluid, such as compressed air, which may be supplied to the cutter head and the spindle by any suitable supply line, such as the flexible airline or hose 7a connected with any suitable source of compressed air (not shown), as will be readily understood by those skilled in this art.

The cutter head assembly 5 with the spindle 7 is moved by a suitable motion transmitting mechanism, which, in the machine of the present example, is constituted by a pantograph 8 mounted on and supported from a generally horizontally disposed arm structure 9 which is supported from the upper end of the main frame or column 1. The pantograph 8 is operatively connected to and suitably pivotally coupled with the forward or outer link or arm 6a of the horizontally swingable link supporting structure 6, so that moving the pantograph 8 will, in the usual manner, correspondingly move the link 6a and the cutter head 5 laterally in a horizontal plane in accordance with the lateral, horizontal motion transmitted thereto by the pantograph 8.

The pantograph 8 includes, in this instance, a tracer carrying arm 10 for moving the pantograph, and this arm 10 carries at its outer rear free end a tracer unit T which is normally positioned above a copyholder or pattern supporting table 11 mounted on the upper end of the main frame or column 1 in horizontally disposed position at the rear of the machine. The tracer carrying arm 10 for moving the pantograph 8 is provided with a suitable operating handle 10a through the medium of which the operator manually moves the tracer unit T to follow the profile surface or surfaces of a suitable pattern or template P mounted and secured on the copyholder or table 11.

The pantograph 8 of the machine of Fig. 1 is of the adjustable type so that the pantograph may be set for full scale duplication in the workpiece of the profile of a pattern, or for scaled reductions in the workpiece of the profile of the pattern. Such a pantograph, for example, may have ratios ranging from full scale, or 1:1 reproduction, or reduced scale reproduction say down to 1:16, as will be readily understood by those familiar with such pantograph types of motion transmitting mechanisms.

As the machine of Fig. 1 is adapted and arranged for profile grinding operations, a suitable grinding tool 12 is provided in operative association with the lower end of the rotary spindle 7 of the cutter head assembly 5, as through the medium of a chuck or other tool clamping and securing means attached to the lower end of the spindle, for high-speed rotation of the grinding tool by the spindle. Such grinding tool may, as in the example hereof, include a cylindrical grinding head or wheel G providing an annular or circular peripheral grinding surface G' for grinding engagement with the workpiece, as will be clear by reference to Fig. 2 of the drawings, in connection with Fig. 1.

In a particular adaptation of the machine of Fig. 1 for a preferred method of profile grinding, a work-holder structure 14 is mounted and secured on the work table 4 of the machine, and includes a vertically reciprocal or oscillatory work table 15 at the upper side of said holder structure 14, for positioning a workpiece for grinding operations thereon by the grinding tool G as the latter is moved laterally by the pantograph 8. Suitable power-driven mechanism indicated generally at 16 in Fig. 1, is provided for vertically reciprocating or oscillating the work table 15 to thus vertically oscillate a workpiece W relative to the grinding tool G which is in grinding engagement therewith during the profile grinding operation. By thus vertically oscillating the work piece relative to the grinding tool (or the grinding tool relative to a fixed workpiece) as the grinding tool is laterally moved in grinding engagement with the workpiece while being rotated at high speed, it is found that an improved grind or cut giving a smoother finish to the completed surface, is obtained and that more even wear of the grinding surface of the grinding wheel results.

The pattern or template P providing the profile surfaces to be duplicated in full scale or reproduced in reduced scale in or on the workpiece W, is accurately positioned and secured on the copyholder or pattern table 11. The workpiece W is secured and clamped on an intermediate work-holder plate 15a fastened on the vertically oscillating work table 15 in position for profile grinding engagement by the universally laterally movable grinding wheel G. In operation, the tracer unit T is positioned with the style forming portion at the lower end thereof in position for engagement with the profile forming surface of the pattern P which it is desired to duplicate or reproduce in the workpiece, while the grinding wheel G of the grinding tool 12 is positioned, through the medium of the pantograph 8, for grinding engagement with the workpiece to grind out and duplicate or reproduce the profile forming surface of the pattern P to be engaged and followed by the tracer unit T. These profile grinding operations are primarily finishing ones, in that the workpiece is usually initially roughly machined or cut-out to approximate the profile forming surfaces to be finally ground out therein by the pantograph controlled grinding tool. As referred to hereinbefore, the workpiece W is usually roughly machined out to approximate the profile surfaces to be ground thereon, so as to leave say only approximately three thousandth to four thousandth inch (.003" to .004") of stock to be ground out from the workpiece in the finishing operations by the grinding tool.

With the pattern P and the workpiece W positioned in the machine, the operator manually grips the operating handle 10a and moves the tracer T laterally along to follow a profile forming surface of the pattern or template P and cause the pantograph 8 to transmit such lateral tracer movements to the grinding tool 12 carried by the spindle 7 in the cutter head 5, so that, the grinding tool is correspondingly shifted or moved laterally and horizontally over the workpiece W with the peripheral circular grinding surface G' thereof in grinding engagement with the workpiece, to duplicate or reproduce the motions of the tracer T as may be required to duplicate or reproduce in or on the workpiece W, the profile forming surface of the pattern P, in full scale or reduced scale in accordance with the adjustment of the pantograph 8.

As hereinbefore referred to and explained, the accuracy and precision of the profile duplicated or reproduced in the workpiece from the pattern by a grinding tool moved by a tracer controlled motion transmitting mechanism, such as exemplified by the tracer controlled pantograph 8 of the machine of Fig. 1, for carrying out these so-called profile grinding operations, is, referring now to the machine of Fig. 1, dependent upon the maintenance without appreciable variation, of the fixed, predetermined spacing or distance between the profile surface engaging portion or style of the tracer unit T and the workpiece engaging grinding surface G' of the grinding wheel G of the tool 12, in that, any variation or change in this predetermined distance will change the position of maximum grind in the workpiece W of the grinding tool over that intended and required for precision reproduction. In accordance with my present invention, I have provided for very fine precision adjustments in such distance or spacing in order to compensate for changes or variations in the predetermined distance between the effective surfaces of the tracer unit and of the grinding tool, as well as for the purpose of arbitrarily adjusting and setting such distance in order to limit the position of maximum grind and the amount of stock which can be ground out by the grinding tool for any such selected or arbitrary setting.

I have, in this particular example of the invention here selected and adapted for a machine of the type of Fig. 1, provided for such precision adjustment and setting of the spacing or distance between the grinding surface of the grinding tool and the pattern engaging surface or style of the tracer unit by a design and construction of tracer unit T by which the operator may make precision adjustments in the tracer unit itself which will result in a desired and predetermined, micrometer measured change in the spacing or distance between the effective pattern engaging surface of the tracer unit T and the workpiece engaging grinding surface G' of the grind wheel G.

For instance, I may, as in the example hereof, effect such adjustments and changes in the distance or spacing between the effective operating surfaces of the tracer unit T and of the grinding wheel G of the tool 12, by adjusting and making measured changes in the radial distance between the longitudinal axis of the body or stem of the tracer unit T and the effective pattern engaging portion or style of such unit, without disturbing the mounting of the tracer unit in or moving the unit bodily relative to the pantograph actuating arm 10 in which the tracer unit is mounted in accurately located position relative to such arm and to the pantograph 8 to be moved thereby.

Such a compensating or maximum grind limiting tracer unit of my invention may take the form of the tracer unit T herein disclosed and described by way of example, in which the unit includes a tracer body 30 adapted to be mounted in the outer free end of the pantograph actuating arm 10, and a tracer style 20 (see Fig. 5) for operative association with the pattern engaging end of the tracer unit T.

The body 30 in this particular example of the invention, referring now to Figs. 4, 6 and 7 of the drawings in particular, is primarily formed of concentric inner and outer spindles 31 and 32, with the outer spindle 32 formed hollow as a cylindrical section tube and the inner spindle 31 formed as a cylindrical section rod or shaft which extends through and is slidably received in the outer hollow or tubular spindle 32. The inner and outer spindles 31 and 32 are assembled together for sliding movements longitudinally relative to each other but are suitably confined and maintained against rotation relative to each other. The inner and outer shafts 31 and 32 may be confined against relative rotation, as in the example hereof, by a pin 33 secured in a transverse or radially disposed bore formed in the inner spindle 31 adjacent the style receiving end thereof, with this pin 33 projected or extended at one end thereof radially outwardly a distance from the outer side of the spindle 31 and slidably received in a longitudinally disposed slot 34 formed in the adjacent side wall of the outer spindle 32 at the adjacent style receiving end of this outer spindle.

Thus, the inner and outer spindles 31 and 32 have limited longitudinal sliding movements relative to each other within the limits of and for a distance determined by the length of the slot 34 in the outer spindle 32, but are held against rotation relative to each other by the pin 33 in the slot 34, so that, the inner and outer spindles are only rotatable about their common longitudinal axis as a unit or single spindle or stem.

The style receiving end of the outer spindle 32 at the pattern engaging side of the tracer unit T, is provided with a style engaging roller 35 secured to the end of the spindle 32 concentric therewith. The roller 35 is formed with its peripheral surface 35a beveled from the inner side of the roller, outwardly and inwardly toward the outer side thereof at an angle, in this instance, of 45° to the longitudinal axis of the spindle 32. The inner spindle 31 extends a distance outwardly beyond the end of the outer spindle 32 and of the roller 35 on spindle 32, and is provided with a roller 36 similar to the roller 35 of shaft 32, and of the same diameter and thickness, and this roller 36 has its peripheral surface 36a beveled or inclined from its outer side inwardly toward its inner side at an angle, in this instance, of 45° to the axis of the spindle 31. The style receiving end of the unit formed by the spindles 31 and 32, is thus provided with parallel rollers 35 and 36 concentric with the longitudinally axis of the unit and providing oppositely beveled, peripheral faces or surfaces 35a and 36a, to thus together form a roller unit having in effect a peripheral groove therearound of generally V-shape in cross section.

The spacing between the rollers 35 and 36, and hence the width of the V-shaped groove around the roller unit formed by these rollers 35 and 36, can be varied or changed and adjusted by longitudinally moving the spindles 31 and 32 in opposite direction to move the rollers 35 and 36 toward and from each other within the limits determined by the longitudinal length of the slot 34 in the outer spindle 32. When the spindles 31 and 32 have been relatively longitudinally moved to position with the pin 33 engaged against the inner end wall of the slot 34, the rollers 35 and 36 are in position of close proximity with minimum spacing therebetween and between their oppositely beveled peripheral surfaces 35a and 36a, so that, the peripheral groove formed around and between the rollers is at its minimum width, as clearly shown in Fig. 7 of the drawings. When the spindles 31 and 32 are moved longitudinally relative to each other in opposite directions to position the pin 33 at the outer end of the longitudinal slot 34 into engagement with the outer end of the slot 34 at the inner side of the roller 35, then the rollers are spaced the maximum distance apart and the peripheral groove formed around and between the oppositely beveled faces 35a and 36a of the rollers is at its maximum width, as will be clear by reference to Fig. 6 of the drawings. By adjusting the rollers 35 and 36 to spaced positions between the position of minimum spacing shown in Fig. 7 and the position of maximum spacing shown in Fig. 6, any desired spacing of the rollers and of the width of the peripheral groove formed between the beveled faces of the rollers can be obtained.

In accordance with my present invention, I have provided as a part of the tracer style unit T, a mechanism for manual actuation by an operator for longitudinally moving the spindles 31 and 32 relative to each other in the desired directions to increase or decrease the spacing between the oppositely beveled peripheral surfaces 35a and 36a of the rollers 35 and 36, respectively, to a desired adjusted spacing; and further I have provided this spindle actuating mechanism to form and provide a micrometer by which the operator may precisely make very fine adjustments in the spacing between the beveled peripheral surfaces 35a and 36a of the rollers 35 and 36.

In the tracer unit T of the illustrated example, such micrometer forming mechanism for actuating the spindles 31 and 32 to adjusted positions, takes a form which includes a micrometer dial forming, cylindrical barrel or thimble member 37 which, referring now to Figs. 6 and 7 of the drawings, is provided with an axial bore 38 therethrough having a reduced diameter section or length 39 extending from the inner end of the larger diameter portion of the bore within the barrel 37, outwardly to and opening through an adjacent end of the barrel. The large diameter portion of the bore 38 opens through the opposite end of the barrel 37 and is provided with internal threading 38a, while the reduced diameter section 39 of the bore 38 is internally screw threaded throughout its length. The internal screw threading 38a of the enlarged diameter section of bore 38 and the internal threading 39a of the reduced diameter section 39 of the bore are of opposite hand thread, that is, in the specific example hereof, the internal threading 38a is a left-hand thread while the internal threading 39a is a right-hand thread.

The manually operable micrometer dial forming barrel 37 is mounted on and operatively associated with the ends of the spindles 31 and 32 opposite the ends thereof provided with the rollers 35 and 36. In the particular example hereof, the micrometer dial receiving end of the outer tubular shaft 32 is provided with external screw threading 32a therearound of left-hand thread. The inner spindle 31 is of greater length than the outer spindle 32 and extends a distance outwardly beyond the threaded micrometer dial receiving end of the spindle 32. Such extended length of the spindle 31 is provided with external screw threading therearound which extends from substantially the adjacent outer end of shaft 32 to the outer end of the spindle 31. The threading 31a on the spindle 31 is a right-hand thread. The micrometer dial forming barrel 37 is mounted in operative relation on and with the threaded ends of the shafts 31 and 32, with the outer shaft 32 extending into the bore 38 of the barrel with its threading 32a in mesh with the threading 38a of the bore, and with the inner spindle 31 extending outwardly through the reduced diameter section 39 of the bore with its threading 31a in mesh with the internal threading 39a of the bore section 39. Thus, rotation of the micrometer dial 37 will, due to the opposite hand threadings in the bore sections 38 and 39, result in movement of the inner and outer spindles 31 and 32 in opposite directions longitudinally relative to each other, the direction of such movement being dependent upon the direction of rotation of the micrometer dial forming barrel 37.

The barrel 37 is formed with an internally threaded, radially disposed bore 37a through a side wall thereof with the inner end of the bore located opposite the adjacent, externally threaded end portion of the outer spindle 32 within the bore 38, and a thumb screw 40 is threaded into such bore for manual rotation to position to engage the outer spindle 32 and releasably lock the barrel 37 against rotation relative to the spindle. If desired, a suitable soft metal or the like disk 40a may be interposed between the end of the thumb screw 40 and the spindle 32, so as to avoid damage or injury to the external threading 32a on the spindle when the thumb screw is screwed into position tightly locking the barrel 37 to the spindle 32.

The dial or barrel 37 is formed with a micrometer scale M formed on and extending completely around the external peripheral surface thereof at and adjacent the outer end of the barrel. This scale M is formed of the usual scale marks, lines or graduations, which, in the present example are calibrated in thousandths of an inch (.001"); that is to say, the rotation of the dial 37 for a distance corresponding to the spacing between adjacent scale marks will result in an adjustment of .001" in the radial distance or spacing between the body or stem formed by the spindles 31—32 of the tracer unit T, and the pattern engaging, outer peripheral surface of the tracer style 20, as will be more fully referred to and explained hereinafter. In the specific example of the tracer unit T of the invention here disclosed, the micrometer scale M consists of twenty-five (25) such scale marks or graduations spaced equal distances apart around the dial or barrel 37, and in this instance, every fifth scale mark is formed of greater length than the four adjacent scale marks at opposite sides thereof, for ease of visual reading by the operator in adjusting and setting the tracer unit. If desired, the scale marks or graduations may also be numbered consecutively around the scale, in this particular example the scale marks would consecutively bear the numbers "1" to "25" around the dial.

Obviously, the micrometer scale M may be calibrated and graduated for various spacings between the scale marks or lines thereof to represent various degrees of adjustment, either less than or more than .001", but in the specific example of the tracer unit of the invention here disclosed as adapted for profile grinding operations with a machine of the type of Fig. 1, it has been found that adjustments to .001" are satisfactory and meet all normal requirements encountered in actual operation and use.

Preferably, as the micrometer dial forming barrel 38 is to be manually rotated by the operator to effect the adjustments in the tracer style unit, the major portion of the exterior surface of the barrel 37 is suitably roughened or knurled between the micrometer scale M and the opposite end of the barrel, as will be clear by reference to Fig. 4 of the drawings in particular.

The micrometer mechanism for adjusting the tracer unit T, is completed by a suitable stop nut or head mounted on the extended outer end of inner spindle 31 adjacent the dial or barrel 37. For example, the spindle 31 is extended a distance outwardly beyond the outer end of the micrometer dial forming barrel 37, and the stop nut or head 41 which is formed of cylindrical cross-section and which is provided with an internally threaded axial bore therethrough is threaded onto the externally threaded end of the spindle 31. This stop nut or head 41 is locked in position on the spindle end 31 by a suitable set screw 41a threaded into a radially disposed bore formed through a side wall of the head 41 with the inner end of the set screw engaging the spindle 31, or engaging a suitable soft metal disk, such as disk 40a employed with the thumb screw 40, to prevent injury to the external threading of the spindle 31.

The stop nut or head 41 secured to the outer end of the spindle 31 is of substantially the same external diameter as the micrometer dial forming barrel 37, and is, of course, axially aligned therewith as both the barrel 37 and the head 41 are, in this instance, mounted on and carried by the spindle 31. The head 41 is provided with an index or zero line 0 which is preferably engraved or cut therein disposed longitudinally of the head on the outer surface thereof parallel with the scale marks or graduations of the micrometer scale M of the dial or barrel 37. Such index or zero line 0 extends from the inner end edge of head 41, which is adjacent scale M on dial 37, a distance outwardly of the head for visual alignment with a desired scale mark of the micrometer scale M, by rotation of the dial forming barrel 37, as will be hereinafter explained. Preferably, the head 41 is formed with its outer peripheral surface around and adjacent its outer end, suitably roughened or knurled, so that the operator may readily grasp and hold the same with the fingers of one hand while rotating the dial 37 with the fingers of the other hand to make the desired adjustments in the tracer unit T.

The micrometer dial forming barrel 37 and the stop nut or head 41 are so mounted and assembled on and in relation with the spindles 31 and 32 and in relation with each other, that when the dial 37 is in position with the style engaging rollers 35 and 36 in their adjusted positions of minimum spacing therebetween (maximum radial distance between the axis of spindles 31—32 and the peripheral surface of style 20) as shown in Fig. 7 of the drawings, the head 41 will be in position relative to the dial 37 and the micrometer scale M, to accurately align the index or zero line 0 with a scale line of the scale M, preferably with one of the longer scale lines referred to hereinabove. In such mounted, assembled position, the micrometer dial or barrel 37 and the head 41 located at the outer end thereof and adjacent thereto in substantially actual continuation thereof, thus form a portion of the body of the tracer unit T of enlarged diameter relative to the diameter of that portion of the tracer body formed by the inner and outer concentric spindles 31 and 32, as will be clear, for example, by reference to Fig. 4 of the drawings.

The style 20 of the tracer style unit T of this example, referring to Fig. 5 of the drawings in particular in connection with Figs. 6 and 7, is, in this instance, formed by an annulus or ring member having its outer periphery forming and providing a circular pattern engaging surface or tread 21. The annular inner side of the style 20 is formed by two oppositely beveled or inclined annular surfaces 22 and 23 which extend radially inwardly from the opposite outer side edges 21a, respectively, of the style 20 and of the peripheral surface or tread 21 thereof, with each such surface inclined inwardly at an angle of 45° to the axis of the style. These oppositely, radially inwardly beveled or inclined annular surfaces 22 and 23 at their inner edges merge into and join an annular interal surface 24 concentric with the axis of the style, and which surface 24 lies in a medial plane through the style normal to the longitudinal axis of the style. Thus each of the beveled surfaces 22 and 23 of the style 20 is identical in width and each has an angle of inclination of 45° to the axis of the style, in the particular example hereof. The internal diameter of the annular surface 24 is, in this instance, slightly greater than the maximum external diameter of the rollers 35 and 36, for a purpose to be referred to hereinafter.

The style 20 so formed and constructed, is adapted to be operatively associated with and engaged by the oppositely beveled rollers 35 and 36 of the spindles 31 and 32, of the tracer style unit, by positioning the rollers 35 and 36 within the style 20 with the axis of the rollers parallel with the axis of the style and with the inner annular portion of the oppositely beveled surfaces 22 and 23 of the style aligned with the space between the oppositely beveled surfaces 35a and 36a of the rollers 35 and 36, respectively, so that the spindles 31 and 32 may be radially or laterally moved as a unit, to position the beveled faces 35a and 36a of the rollers in engagement with the adjacent portions of the oppositely beveled annular surfaces 22 and 23, respectively, of the style, as will be clear by reference to Figs. 6 and 7 of the drawings. The faces 22 and 23 of the style are each inclined at a 45° angle to the axis of the style and the beveled surfaces 35a and 36a of the rollers 35 and 36, respectively, are also each inclined at an angle of 45° to the axis of the spindles 31 and 32, so that, the oppositely beveled annular surfaces of the style form complementary surfaces for engagement by the annular beveled surfaces of the rollers 35 and 36 when the spindles 31 and 32 are moved laterally or radially to engage portions of the beveled surfaces of the rollers with adjacent portions of the complementary, inclined annular surfaces, respectively, of the style.

Hence, with the style 20 in operative association with the rollers 35 and 36 to form the tracer style unit T, the outer peripheral surface or tread 21 of the style can be maintained in engagement with a profile forming surface of a pattern or template, such as the pattern P of Fig. 1, by moving the tracer unit to engage the style 20 between the pattern surface and the rollers 35 and 36, with portions of the beveled peripheral surfaces 35a and 36a of the rollers engaged with the adjacent portions of the annularly inclined or beveled surfaces 22 and 23, respectively, of the style. Thus, the annular, oppositely beveled surfaces 22 and 23 of the style 20 at the portions thereof engaged by the adjacent portions of the complementary beveled surfaces of the rollers 35 and 36, extend and are disposed within the adjacent portion of the space between the bevelled surfaces 35a and 36a of the rollers, which space forms and defines an annular peripheral groove around and between the rollers 35 and 36. Lateral or radial movement of the tracer unit T to cause the style 20 to follow a pattern profile surface will revolve the style 20 in engagement with the pattern surface, so that, the style has a generally planetary motion around and about the rollers 35 and 36. In accordance with my present invention, the rollers 35 and 36 with their respective spindles 31 and 32 are mounted and arranged for free rotation about their common axis as the tracer is laterally moved in engagement with the style to revolve or roll the style along and following the pattern surface, so that, the rollers 35 and 36 are rotated simultaneously and as a unit by the engagement of their beveled surfaces 35a and 36a with the complementary beveled surfaces 22 and 23 of the style as these rollers are laterally moved in contact with the revolving style.

The radial distance between the common axis of the spindles 31 and 32 and the rollers 35 and 36 can be varied or adjusted by increasing or decreasing the spacing between the rollers 35 and 36, and thus increasing or decreasing the width of the annular peripheral groove formed around and between, the rollers 35 and 36 by the oppositely beveled peripheral surfaces 35a and 36a of these rollers. Referring now to Fig. 7 of the drawings, in which the rollers 35 and 36 are shown in their adjusted positions of minimum spacing to give the maximum radial distance between the axis of the rollers and the annular periphery or tread 21 of the style, by providing the minimum spacing between the beveled surfaces 35a and 36a of the rollers, it will be clear that the rollers are engaged with the inner portion of the annular beveled surfaces 22 and 23 of the style, due to the minimum width of the annular space around and between the beveled surfaces 35a and 36a of the rollers. The radial distance between the axis of the rollers and the portion of the peripheral surface or tread 21 of the style engaging a pattern surface can be decreased by increasing the spacing between the rollers 35 and 36, so that, the width of the space between the beveled surfaces 35a and 36a thereof is increased, which thus permits the beveled surfaces of the rollers to move radially outwardly over and relative to the complementary beveled surfaces of the style and thus engage with such surfaces at points nearer to the portion of the outer peripheral surface or tread 21 of the style engaged with a pattern surface. Such shift of position of the rollers radially outwardly of the style moves the tracer unit bodily radially outwardly a corresponding distance relative to the style and thus reduces the radial distance between the axis of the spindles defining the axis of the body or stem of the style and the adjacent pattern engaged portion of the outer peripheral surface or tread 21 of the style. In this manner the radial distance between the axis of the tracer body, 31 and 32 forming the axis of the tracer body, and the pattern engaged portion of the peripheral surface or tread 21 of the style 20 can be varied and adjusted to any desired distance between the maximum distance with the minimum roller spacing shown in Fig. 7, and the minimum distance with the maximum roller spacing shown in Fig. 6. In the minimum distance position of Fig. 6, the spacing of the rollers has been increased, so that, the opposite beveled surfaces thereof engage outermost portions of the complementary beveled surfaces of the style with the outer sides of the rollers 35 and 36 disposed approximately in the planes of or flush with the adjacent opposite outer sides, respectively, of the style 20, and with the tracer stem or body moved radially outwardly relative to the outer peripheral surface or tread to its position of minimum spacing from the outer, tread surface 21 of the style 20. Thus, by such arrangement of the complementary beveled surfaces of the stem rollers and of the style, axial or longitudinal movement of the rollers relative to the style in effect, increases or decreases the effective diameter of the style engaging surfaces of the rollers.

By the foregoing design of the roller forming style 20, having its minimum internal diameter at least slightly greater than the maximum external diameter of the rollers 35 and 36, the style is readily removable from operative association with the rollers 35 and 36. Thus, the style may be readily replaced by another style of the same type but having a different external diameter and/or a different width of pattern engaging peripheral surface or tread 21, if desired, or a style 20 may be readily removed in the event of injury or damage thereto and a new style substituted therefor. By thus providing the style with a minimum internal diameter greater than the maximum external diameter of the rollers 35 and 36, the assembly of the style into operative association with the rollers is facilitated, although the removable association of the style with the rollers is not necessarily essential in every form and adaptation of my invention and it is not intended to limit the invention thereto, as if desired or found expedient, under the conditions of any particular adaptation, the style can be formed with its minimum external diameter less than the maximum external diameter of the rollers 35 and 36, and initially assembled with the rollers so as to be normally non-removable therefrom.

The tracer unit T in the particular example hereof designed for and adapted to use with the tracer controlled pantagraph machine of Fig. 1 arranged for carrying out the hereinbefore described profile grinding operations, is mounted on and carried by the actuating arm 10 of the pantagraph 8. For example, the arm 10 of the machine of Fig. 1, is provided with a boss or hub portion 17, referring now to Figs. 6 and 7 of the drawings in particular, which is located at the outer free end of the arm 10 disposed transversely thereto with its longitudinal axis perpendicular to the longitudinal axis of the arm 10. This boss or hub portion 17 is formed with a longitudinal or axial bore 17a extending completely therethrough and opening through the opposite ends thereof. The tracer unit T is mounted on the arm 10 for rotation thereon as a unit with the spindles 31 and 32 of the unit extending axially through the bore 17a and rotatably journaled therein by suitable anti-friction bearings or the like, such as the needle bearings 18 mounted within the bore 17a of the hub portion 17 adjacent opposite ends thereof and rotatably receiving the outer spindle 32 of the spindle unit 31—32. In this mounted position the micrometer dial 37 is located at and adjacent one end, in this instance the upper end, of the hub portion 17 of the arm 10, and the rollers 35 and 36 are positioned at and spaced from the opposite end, in this instance the lower end, of the hub portion 17 of arm 10.

The micrometer dial forming barrel 37 in this specific example, may rest upon the upper end of hub portion 17 of arm 10 with the under surface of the barrel 37 having bearing engagement with the upper edge 17b of the hub portion 17, so that, the spindles 31 and 32 with the rollers 35 and 36 and the micrometer dial forming barrel 37 are rotated as a unit as the tracer is radially moved to cause the style 20 to follow a pattern surface. The under surface of the inner end of the micrometer dial forming barrel 37 has rotatable bearing engagement with the adjacent upper edge surface 17b of the hub portion 17 of the arm 10, and these respective bearing surfaces are accurately machined and finished for minimum friction and accurate positioning of the tracer unit in mounted position in the hub 17 of arm 10.

In operation and use of the pantograph machine of Fig. 1 for profile grinding, the pattern P in this illustrative example happens to be formed with an arcuate slot S which is to be reproduced in scaled relation as the slot S' in the workpiece (see Fig. 2) mounted on the intermediate work holder plate 15a on the worktable 15 of the machine (see Fig. 1). Referring particularly to Fig. 3 of the drawings, the arcuate slot S of the pattern P provides the curved vertically disposed profile forming surfaces f and r defining the opposite side surfaces, and the vertical curved surfaces e forming the opposite end surfaces, of and defining the arcuate slot S. The pattern P is secured on the copyholder or work table 11 and a style 20 of the tracer style unit T, of an external diameter less than the width of the slot S, is placed in the slot with its peripheral surface or tread 21 adapted to be engaged in rolling contact with any one of the slot defining profile forming surfaces $f$, $r$, or $e$. The pattern table 11 is suitably adjusted and positioned and the pattern P is suitably secured in position thereon relative to the workpiece W and to the tracer unit T mounted in the pantograph actuating arm 10, with the rollers 35 and 36 of the tracer unit positioned and received within the style 20, so that, by radial or lateral movement of the tracer arm 10 by means of the handle 10a, the beveled peripheral surfaces 35a and 36a will engage with adjacent portions of the complementary beveled or inclined annular surfaces 22 and 23, respectively, of the style 20. In the foregoing operative association and relation of the rollers 35 and 36 and the style 20, the rollers are, in effect, in "floating" association with the style 20, with the style 20 slidably resting upon and supported on the pattern table 11 if the slot S is cut through the pattern P, or upon the upper surface of the bottom wall of the slot if the slot is not cut through the pattern, so that, by moving the tracer unit T and the arm 10 laterally, the rollers can be engaged at any desired location around the beveled inner surfaces of the style 20 to force the style into engagement with the desired profile forming surface of the slot S of the pattern P. The style S can be thus held and maintained in pattern surface engaging position between the rollers and the selected profile forming surface of the slot S as the tracer unit T is laterally moved to cause style 20 to follow and roll along the profile forming surface, with the body of the tracer unit T being rotated about its longitudinal axis in the hub 17 of the arm 10 by the rolling contact of the rollers 35 and 36 with the surfaces 22 and 23 of the revolving style 20.

As hereinbefore pointed out, these profile grinding operations are usually performed as finishing operations, and the workpiece W initially has a slot machined therein approximating the finished slot S', say with only the order of three thousandths to four thousandths of an inch (.003" to .004") of stock remaining to be ground out or cut away by the tracer controlled movement of the grinding tool 12 by the pantograph 8. Thus, at the start of the grinding operations, the grinding wheel G of tool 12 is located within the slot initially machined out in workpiece W (see Figs. 1 and 2), and the style 20 is located in the slot S of pattern P in operative association with the rollers 35 and 36 of the tracer unit T. (See Figs. 1 and 3.)

The operator, by grasping the handle 10a, may then laterally move the tracer unit T and the pantograph actuating arm 10 toward that profile forming surface of the slot S of the pattern P which it is desired to reproduce and grind out in the workpiece W. Such movement of the tracer unit T will cause the pantograph 8 to transmit the corresponding motion to the cutter head 5 and the grinding tool 12 carried thereby, but in the reverse direction. The operator continues such movement until the grinding surface G' of the grinding wheel G is in grinding engagement with that surface of the roughed out slot in the workpiece W which corresponds to the profile forming surface toward which the operator has moved the tracer style unit T. The operator then laterally moves the tracer style unit T along and to follow the selected profile forming surface of the pattern slot S and may repeat such pattern surface following motions of the tracer unit T back and forth over and across the surface until the grinding wheel G has reached its position of maximum grind in the workpiece with the style 20 of the tracer style unit T in full maximum rolling engagement along and across the profile forming surface of the pattern P being reproduced.

In the practice hereinbefore referred to in which the profile grinding operations are carried out and performed by a series of grinds, each of which is limited to the removal of a thickness of stock of the workpiece less than the maximum thickness of stock to be ground away in order to complete the grinding of the reproduced profile surface, the operator loosens the thumb screw 40 of the micrometer dial 37 and then, by grasping the stop nut or head 41 in the fingers of one hand and the micrometer dial with the fingers of the other hand, rotates the micrometer dial in the direction to move the rollers 35 and 36 to their position of minimum spacing for the maximum distance between the axis of the rollers and the portion of the peripheral surface or tread 21 of the style 20 engaged with a pattern surface, until the rollers 35 and 36 are in their position of minimum spacing and the index or zero line) on the head 41 is aligned with a scale mark or graduation of the micrometer scale M. The operator then locks the micrometer dial in such position and proceeds to move the tracer back and forth following the profile forming surfaces $f$, $r$, and $e$, or any of them, of the pattern slot S, until the grinding tool 12 has reached its position of maximum grind for that setting. Assuming that the slot in the workpiece W has been roughed out to within four thousandths of an inch (.004") of the finished slot S', the operator, after the initial movement of the tracer unit T to follow the surfaces of the pattern slot until the position of maximum grind has been reached, again adjusts the micrometer dial 37 by rotating it in the required direction to increase the spacing between the rollers 35 and 36 for a distance, assuming the micrometer scale in the example here given to be graduated in thousandths of an inch, to bring the next scale mark or graduation in accurate alignment with the index or zero line 0, and then locks the micrometer dial in this setting by the thumb screw 40. Such increase in spacing of the rollers 35 and 36 will, as hereinbefore explained, permit the beveled surfaces 35a and 36a of the rollers to engage the complementary beveled or inclined surfaces 22 and 23 of the style 20 at locations thereon nearer and radially outwardly moved toward the adjacent portion of the outer periphery or tread 21 of the style 20, and thus will reduce such radial distance by one thousandth of an inch (.001"). The operator then again moves the tracer unit T back and forth over and following the profile forming surfaces of the pattern slot S until the style 20 will fully engage the profile forming surfaces at every point therealong and the grinding tool 12 will have thus reached its position of maximum grind for such adjustment of the tracer unit T, and will have ground away and removed stock to the thickness of one thousandth of an inch (.001") from the workpiece. With the example given, the reproduction of the profile forming surfaces in the workpiece to produce the slot S' in finished form, can be carried out by making a series of four (4) grinds and by adjusting the tracer style unit T of the invention with the micrometer dial 37 of the micrometer adjusting mechanism, to increase the radial distance between the periphery 21 of the style 20 and the axis of the rollers 35 and 36, one thousandth of an inch (.001") and thereby limit the stock removal to a thickness of one thousandth of an inch (.001"), if the pantograph 8 is set for full scale reproduction.

However, if instead of being set for full scale reproduction, the pantograph 8 is set for a reduced scale reproduction, say for example a reduction of 5 to 1, then the operator, in order to obtain a maximum grind from the grinding tool 12 for stock removal of a thickness of .001", will rotate the micrometer dial 37 a distance which will position the index or zero line 0 on the head 41 in accurate alignment with the fifth (5th) scale mark or graduation from that graduation with which the index or zero line is aligned at the start of the adjustment. Thus, the amount or degree of rotation of the micrometer dial 37, for a desired adjustment in the spacing between the axis of the rollers 35 and 36 and the tread 21 of the style 20, will be in direct proportion to the ratio of reduction for which the pantograph mechanism 8 is adjusted and set.

With such profile grinding operations, as hereinbefore referred to and explained, the grinding surface G' of the grinding wheel G of the tool 12 is frequently worn to an extent that may sufficiently reduce the diameter of the surface G' to a degree such that the desired accuracy and precision of reproduction in the workpiece W, of the profile surfaces in the pattern P, cannot be attained. In such event, an adjustable compensating tracer style unit of my invention, such as the unit T of the disclosed example, enables the operator to quickly and accurately make the necessary adjustment in the radial distance between the axis of the rollers 35 and 36 of the unit, and that portion of the tread 21 of the style 20 in engagement with the pattern P, to change or vary the distance between the pattern surface engaged portion of the style tread 21 and the portion of the grinding wheel surface G' that is in engagement with the workpiece, the required amount to accurately compensate and adjust for such grinding surface wear. Such an adjustment is made by the operator rotating the micrometer dial 37 in the proper direction for the required distance, as accurately visually measured and determined by and from the scale M and the zero line 0, to increase the spacing between the rollers 35 and 36, and thus bodily radially move the body of the tracer unit and the style 20 relative to each other to decrease the radial distance between the axis of the rollers and that portion of the tread 21 of the style that is engaged with the pattern P, as required to make the necessary compensating adjustment in the distance between the pattern surface engaged portion of the tread 21 of the style, and a portion of the grinding surface G' of the grinding wheel G that is in grinding engagement with the workpiece W. With respect to the inaccurate results caused by grinding tool wear, it will be noted that in reproducing the profile surfaces f, r, and e which define the enclosed slot S of the pattern P, if there is wear of the grinding surface G' of the grinding wheel G, such wheel having been selected as of a predetermined diameter for this particular operation, then the finished slot S' reproduced in the workpiece W will be of smaller dimensions as to width and length than the finished slot that it was intended and desired to reproduce, and that would have been reproduced in the workpiece by the grinding operation with the selected predetermined diameter of grinding surface G' of grinding wheel G. And, as hereinbefore explained, inaccuracies of similar character will result from grinding tool wear in reproducing various designs and shapes of profile forming surfaces of a pattern.

The invention thus provides a compact and structurally simple tracer style unit capable of general tracer use, in which the radial distance between the peripheral pattern engaging surface of the style of the unit and the longitudinal axis of the portion of the body or stem of the tracer immediately associated with the style, can be changed by very fine, precise adjustments thereof through the medium of a micrometer mechanism which forms a part of the unit and which is located for accurate visual reading and manual adjustment by an operator, so that, the unit may be adjusted by an operator without removing the unit from its mounted position, in order to compensate or adjust the unit to overcome or to meet various operating conditions for which such radial distance is or may become critical. And which invention further provides in such a tracer unit, a form of and a mounting for the style of the unit by which the style has rolling contact with a pattern surface, and the structure of the tracer body or stem of the unit which is operatively associated with the style is itself freely rotatable and has rolling contact with the style, so that, the style offers minimum resistance in operation and thereby reduces the manual forces required from the operator in moving the tracer unit.

It is to be understood that the presentation herein of a form of tracer style unit embodying my invention as associated with a machine or apparatus particularly adapted for so-called profile grinding, together with the detailed description of such profile grinding operations, is not intended to and does not in any sense limit my invention to such types of machine or to such operations or character of work, as the invention is capable of broad adaptation and use wherever tracers are used in following a pattern or surface. The profile grinding operations were selected and have been explained herein because such operations present and exemplify certain of the particular conditions and the difficulties resulting therefrom, in an accentuated degree, which are efficiently overcome by tracer style units of my invention, so that, such conditions and difficulties which are particularly encountered in profile grinding operations, serve to more clearly and sharply bring out and make clear the principles and various features of my invention to enable a complete understanding thereof. It will be clear to and readily recognized by those skilled in the art that tracer style units embodying my invention are adaptable to and can be of advantage in use with any tracer of the broad character herein exemplified for following surfaces of a pattern, without limitation to the type or character of the motion transmitting or other mechanism that is associated with and actuated by the tracer, and without regard to the character of the operation to be performed by and resulting from the use of such tracer.

Aside from the above it will also be evident that various other forms, designs, constructions and arrangements of, and combinations including, tracer styles embodying my invention, may be resorted to without departing from the broad spirit and scope of my invention, and hence I do not intend or desire to limit my invention in all respects to the exact and specific disclosures hereof.

What I claim is:

1. In a tracer unit, in combination, a tracer stem, a pattern engaging style positioned at one end of said stem, said style being formed by a ring member having its outer periphery providing an annular pattern engaging surface therearound and its inner periphery providing an annular surface having portions thereof spaced varying distances radially from the axis of said stem for engagement by the tracer stem, said tracer stem including inner and outer spindles longitudinally movable relative to each other in opposite directions, the adjacent ends of said spindles at the end of said stem adapted to be positioned within and surrounded by the inner annular surface of said style and being provided with style engaging members, respectively, extended radially from said spindles, said style engaging members being spaced apart for movement toward and from each other to vary the spacing therebetween by relative longitudinal movements of said inner and outer spindles, said style engaging members being formed to provide surfaces spaced radially outwardly from the axis of the spindles for engaging adjacent portions of the inner annular surface of the style, and means for longitudinally moving said spindles in opposite directions relative to each other, to increase or decrease the spacing between said spindle carried members to engage said annular inner style surface at different locations thereon spaced varying distances radially from said stem to adjust the radial position of the stem relative to the style.

2. In a tracer unit, in combination, a tracer stem, a pattern engaging style positioned at one end of said stem, said style being formed by a ring member having its outer periphery providing an annular pattern engaging surface therearound and its inner periphery providing an annular surface for engagement by the tracer stem, said inner annular surface of the style being formed with oppositely inclined radially outwardly extending faces therearound, said tracer stem including inner and outer concentric spindles longitudinally movable relative to each other in opposite directions, circular members on the adjacent ends, respectively, of and concentric with said spindles at that end of said stem adapted to be positioned within and surrounded by the inner annular surface of said style, said circular members providing oppositely beveled peripheral surfaces therearound, respectively, complementary to and adapted to engage with the oppositely inclined faces, respectively, of the inner peripheral surface of said style, said circular members being adapted to be moved radially by motion of said spindles to engage the oppositely inclined faces, respectively, of said style, and means for longitudinally moving said spindles in opposite directions relative to each other, to increase or decrease the spacing between the oppositely beveled surfaces of said style engaging members to adjust the radial position of the stem relative to the pattern engaging surface of the style when the stem is moved to position said spindle carried members in engagement with the style.

3. In a tracer unit, in combination, a tracer stem, a pattern engaging style for engagement with said stem at one end thereof, said style being formed by a ring member having its outer periphery providing an annular pattern engaging surface therearound and its inner periphery providing an annular surface therearound for engagement by the tracer stem, said inner annular surface of the style being formed of oppositely inclined radially outwardly extending annular faces, said tracer stem including inner and outer concentric spindles longitudinally movable relative to each other in opposite directions, circular members on and concentric with said spindles positioned at the adjacent ends, respectively, of the spindles at that end of said stem adapted to be positioned within and surrounded by the inner annular surface of said style, said circular members being provided with oppositely beveled peripheral surfaces therearound, respectively, complementary to and adapted to engage with the oppositely inclined faces, respectively, of the inner peripheral surface of said style, said circular members adapted to be moved radially by lateral motion of said stem to engage the oppositely beveled surfaces thereof with a portion of the oppositely inclined faces, respectively, of said style, said inner spindle at the end of the stem opposite said circular members being extended outwardly a distance beyond the adjacent end of the outer spindle, a micrometer dial forming member threaded onto the adjacent ends of the inner and outer spindles by opposite hand threading, respectively, for rotation about the axis of the spindles to longitudinally move said spindles relative to each other in opposite directions to move said spindle carried circular members from or toward each other to increase or decrease the spacing between the oppositely beveled surfaces of said style engaging members.

4. In combination, a tracer support for movement over and across a pattern, said support being formed with a hub portion disposed transversely thereof and having a bore extending therethrough, a tracer unit mounted on said support and including a stem freely rotatably journaled in and extending through the bore of said hub portion, said stem including a dial member thereon and rotatable therewith as a unit, said dial member being located on the stem at the side of said support opposite the pattern side thereof, the end edge of said hub portion adjacent said dial member providing a bearing surface for rotatably engaging the adjacent end of said dial member, said tracer stem comprising inner and outer concentric spindles movable longitudinally relative to each other in opposite directions, the ends of said spindles being threaded into said dial member by opposite hand threading, said dial member being manually rotatable to longitudinally move said spindles in one direction or the other, means for releasably locking said dial member to one of said spindles for rotation of the dial member with the spindles as a unit, means on said spindles for maintaining the spindles against rotation relative to each other, roller members on the ends of said spindles, respectively, at the side of said support opposite said dial member, said roller members being concentric with said spindles and being movable toward and from each other to vary the spacing therebetween by longitudinal movements of said spindles by manual rotation of said dial member, the inner spindle of said stem being extended outwardly a distance beyond the outer end of said dial member, and a head on the extended end of said spindle forming a stop for abutting the adjacent end of said dial member to limit longitudinal movements of said spindles in one direction of adjustment by said dial member, said dial member being formed with a micrometer scale therearound adjacent said stop member, and said stop member being formed with an index line thereon for cooperation with the scale of said dial member.

5. In a tracer unit, in combination, a tracer stem, a tracer style mounted for engagement by and movement with said stem to follow the surface of a pattern, said tracer style being formed with an opening therein, said tracer stem being formed with a style engaging portion adapted to be received in said style opening, a portion of said style adjacent said stem receiving opening having portions thereof located at varying radial distances, respectively, from said stem for engagement by the style engaging portions of said stem, said style being formed with a pattern engaging surface spaced outwardly a distance radially from the longitudinal axis of the stem and from the stem engaging portion of the style adjacent said stem receiving opening therein, and said style engaging portion of the stem being movable to adjusted positions to engage said style surface at different locations thereon, spaced varying distances, respectively, from the axis of said stem to thereby selectively vary the engaged position of said stem relative to said pattern engaging surface.

6. In a tracer unit, in combination; a tracer stem mounted for movements over a pattern; a tracer style positioned for engagement by one end of and movement with said stem to follow the surface of a pattern; said tracer stem and said style being mounted and coupled for limited movements relative to each other radially of the axis of said stem, said tracer style having a pattern engaging surface spaced outwardly a distance thereon radially from said stem and also having a surface located thereon between said pattern engaging surface and said stem for engagement by the stem, said latter surface being inclined at an angle relative to the axis of said stem; said stem having an inclined surface complementary to and for engagement with said inclined surface of the style by movement radially of the stem relative to the style; and said stem being also mounted for movements axially in either direction relative to said style to adjust the position radially of the inclined surface of said stem relative to the inclined surface of the style for engagement of said surfaces.

7. In a tracer, in combination; a tracer stem; a pattern engaging style formed by a ring member having an annular pattern engaging surface around its outer periphery and an annular stem engaging surface around its inner periphery; said stem being extended into the space surrounded by the inner annular surface of said style and being movable relative to said style radially of the axis of the stem toward and from said inner surface; the inner surface of said style being formed by annular surfaces extending radially outwardly of the style and diverging in opposite directions axially relative to said stem; a roller unit on said stem in the space surrounded by said inner surface of the style; said roller unit being mounted for free rotation about the axis of said stem and being comprised of spaced roller members having their facing surfaces formed to provide a V-groove therebetween and therearound; said roller members being mounted for movements axially of said stem toward or from each other to increase or decrease the width of the V-groove therebetween; said roller members being movable with said stem to and from position with the annular divergent surfaces at the inner periphery of the style received in said V-groove in contact with the facing surfaces, respectively, of said roller members; and means on said stem for moving said roller members toward or from each other to adjust the spacing between the facing surfaces of the V-groove formed by and between said roller members.

8. In a tracer unit, in combination; a tracer stem; a tracer style positioned at one end of said stem for engagement with and movement by said stem to follow the surface of a pattern; said style being formed to provide a pattern engaging surface spaced outwardly thereon a distance radially from said stem; said stem and said style being constructed and connected to form a coupling therebetween for movements of said style and said stem relative to each other radially of the axis of the stem to vary the distance between such axis and the pattern engaging surface of the style; said coupling between said stem and style including adjustable means for variably limiting the extent of radial movement outwardly of said stem relative to said style toward said pattern engaging surface for positioning the stem with its axis spaced varying distances, respectively, from said surface; micrometer adjusting mechanism mounted at the end of said stem opposite the style engaging end thereof; and actuating mechanism operatively connecting said micrometer adjusting mechanism with said adjustable means.

HARLOW KLEMA.

REFERENCES CITED

The following references are of record in the file of this patent:

UNITED STATES PATENTS

| Number | Name | Date |
| --- | --- | --- |
| 1,981,117 | Oakley | Nov. 20, 1934 |
| 2,289,532 | Thrasher | July 14, 1942 |
| 2,515,356 | Puderbach | July 18, 1950 |

FOREIGN PATENTS

| Number | Country | Date |
| --- | --- | --- |
| 621,785 | Germany | Nov. 13, 1935 |